(12) United States Patent
Mizumaki

(10) Patent No.: US 7,956,838 B2
(45) Date of Patent: Jun. 7, 2011

(54) DISPLAY DEVICE, INSTRUMENT PANEL, AUTOMATIC VEHICLE, AND METHOD OF DRIVING DISPLAY DEVICE

(75) Inventor: Hidetaka Mizumaki, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 990 days.

(21) Appl. No.: 11/814,386

(22) PCT Filed: Jan. 20, 2006

(86) PCT No.: PCT/JP2006/300864
§ 371 (c)(1), (2), (4) Date: Jul. 20, 2007

(87) PCT Pub. No.: WO2006/080254
PCT Pub. Date: Aug. 3, 2006

(65) Prior Publication Data
US 2009/0033611 A1    Feb. 5, 2009

(30) Foreign Application Priority Data

Jan. 25, 2005  (JP) ................ 2005-017388

(51) Int. Cl.
*G09G 3/36* (2006.01)
(52) U.S. Cl. .......................................... 345/102
(58) Field of Classification Search ............ 345/102; 362/600–616
See application file for complete search history.

(56) References Cited

U.S. PATENT DOCUMENTS

| | | | |
|---|---|---|---|
| 6,268,843 B1 | 7/2001 | Arakawa | |
| 6,803,901 B1 * | 10/2004 | Numao | 345/102 |
| 7,113,164 B1 | 9/2006 | Kurihara | |
| 7,176,873 B2 | 2/2007 | Nakamura et al. | |
| 7,233,304 B1 * | 6/2007 | Aratani et al. | 345/87 |
| 7,256,763 B2 * | 8/2007 | Kaneki et al. | 345/102 |
| 7,449,838 B2 * | 11/2008 | Kumamoto | 315/169.1 |
| 7,492,345 B2 * | 2/2009 | Jin et al. | 345/102 |
| 2003/0122771 A1 * | 7/2003 | Sumiyoshi et al. | 345/102 |
| 2005/0057486 A1 | 3/2005 | Aoki et al. | |

(Continued)

FOREIGN PATENT DOCUMENTS

JP    11-202781 A    7/1999

(Continued)

OTHER PUBLICATIONS

Official Communication for PCT Application No. PCT/JP2006/300864; mailed on Apr. 11, 2006.

(Continued)

*Primary Examiner* — Regina Liang
*Assistant Examiner* — Tom V Sheng
(74) *Attorney, Agent, or Firm* — Keating & Bennett, LLP

(57) ABSTRACT

A display device includes an illuminator; a display panel for performing displaying by using light which is emitted from the illuminator; and a control circuit for controlling the illuminator. The illuminator includes a plurality of light source blocks, at least one light source belonging to each of the plurality of light source blocks. A displaying region of the display panel has a plurality of regions each performing displaying by using light which is emitted from a respective one of the light source blocks. The control circuit detects a level of a display signal which is input to each of the plurality of regions, and is capable of controlling a luminance of the respective light source block in accordance with the detected level of the display signal.

23 Claims, 12 Drawing Sheets

U.S. PATENT DOCUMENTS

2006/0007100 A1   1/2006   Hong et al.

FOREIGN PATENT DOCUMENTS

| | | |
|---|---|---|
| JP | 2000-321571 A | 11/2000 |
| JP | 2002-072920 A | 3/2002 |
| JP | 2002-099250 A | 4/2002 |
| JP | 2002-352611 A | 12/2002 |
| JP | 2004-246117 A | 9/2004 |

OTHER PUBLICATIONS

Official Communication issued in corresponding European Patent Application No. 06712089.9, mailed on Jun. 10, 2009.

English translation of the official communication issued in counterpart International Application No. PCT/JP2006/300864, mailed on Aug. 21, 2008.

* cited by examiner (a)

(b)

DISPLAY DEVICE, INSTRUMENT PANEL, AUTOMATIC VEHICLE, AND METHOD OF DRIVING DISPLAY DEVICE

BACKGROUND OF THE INVENTION

1. Field of the Invention

The present invention relates to a display device, and in particular to a display device having an illuminator as well as a driving method for the same. The present invention also relates to an instrument panel and an automotive vehicle having such a display device.

2. Description of the Related Art

In recent years, on the strength of being thin and consuming little power, liquid crystal display devices have been broadly used in laptop personal computers, mobile phones, camera-incorporated VTRs having a liquid crystal monitor, etc.

A liquid crystal display device is not a self-light-emitting display device which is capable of emitting light by itself, unlike a CRT (cathode-ray tube) or an EL (electroluminescent) display device. Therefore, a liquid crystal display device includes an illuminator (called a backlight) provided at the rear face side of a liquid crystal display panel, and performs displaying by utilizing light from this backlight.

As a light source for backlighting, a cold-cathode tube has often been used conventionally. Recently, from the standpoint of environmental concerns and the like, there are increased needs for mercury-free constructions, and thus use of an LED (light-emitting diode) as a light source for backlighting has been proposed.

However, LEDs are currently inferior to cold-cathode tubes in terms of efficiency of optical conversion. Therefore, using an LED to realize a high luminance similar to that of a cold-cathode tube would result in an increased power consumption.

As a technique for solving this problem, Patent Document 1 discloses a technique of enhancing the efficiency of light utility by providing a reflection-type polarizer between an illuminator and a liquid crystal display panel, thus allowing for lower power consumption.

[Patent Document 1] Japanese Laid-Open Patent Publication No. 11-202781

However, depending on the purpose, a liquid crystal display device is required to have a very superbly low power consumption, so that even the technique disclosed in Patent Document 1 may not provide a desired level of low power consumption.

SUMMARY OF THE INVENTION

In order to overcome the problems described above, preferred embodiments of the present invention provide a display device having a superbly low power consumption, and a driving method for the same, as well as an instrument panel and an automotive vehicle having such a display device.

A display device according to a preferred embodiment of the present invention is a display device including: an illuminator; a display panel for performing displaying by using light which is emitted from the illuminator; and a control circuit for controlling the illuminator, wherein, the illuminator includes a plurality of light source blocks, at least one light source belonging to each of the plurality of light source blocks; a displaying region of the display panel has a plurality of regions each performing displaying by using light which is emitted from a respective one of the plurality of light source blocks; and the control circuit detects a level of a display signal which is input to each of the plurality of regions, and is capable of controlling a luminance of the respective light source block in accordance with the detected level of the display signal.

In a preferred embodiment, in accordance with the level of a display signal corresponding to a highest display luminance among display signals having been detected with respect to each of the plurality of regions, the control circuit controls the luminance of each light source block based on a predetermined relationship which assigns a higher luminance for the light source block as a display luminance corresponding to the display signal becomes higher.

In a preferred embodiment, the control circuit controls the luminance of each light source block by varying an emission intensity of the light source belonging to each light source block.

In a preferred embodiment, the control circuit is capable of controlling the luminance of each light source block by varying an activation time of the light source belonging to the respective light source block.

In a preferred embodiment, the plurality of regions include at least two regions arranged along a horizontal scanning direction of the display panel.

In a preferred embodiment, during a plurality of periods into which a specific horizontal scanning period is divided, the control circuit sequentially detects levels of display signals which are input to the at least two regions arranged along the horizontal scanning direction.

In a preferred embodiment, the plurality of regions include at least two regions arranged along a vertical scanning direction of the display panel.

In a preferred embodiment, during a plurality of periods into which a specific vertical scanning period is divided, the control circuit sequentially detects levels of display signals which are input to the at least two regions arranged along the vertical scanning direction.

In a preferred embodiment, each of the plurality of light source blocks includes, near a boundary with an adjoining light source block, a further light source which is controlled in a similar manner to the light source belonging to the adjoining light source block.

In a preferred embodiment, the control circuit varies the luminance of each light source block once in a plurality of vertical scanning periods.

In a preferred embodiment, the control circuit includes: a horizontal counter for counting a dot clock signal; a decoder for decoding a count value in the horizontal counter and outputting a decode signal; and a light-source control signal generator for, based on the decode signal, selectively outputting to one of the plurality of light source blocks a light-source control signal which is in accordance with the level of the display signal.

In a preferred embodiment, the control circuit includes: a vertical counter for counting a horizontal synchronizing signal; a decoder for decoding a count value in the vertical counter and outputting a decode signal; and a light-source control signal generator for, based on the decode signal, selectively outputting to one of the plurality of light source blocks a light-source control signal which is in accordance with the level of the display signal.

In a preferred embodiment, the control circuit includes: a horizontal counter for counting a dot clock signal; a vertical counter for counting a horizontal synchronizing signal; a decoder for decoding count values in the horizontal counter and the vertical counter and outputting decode signals; and a light-source control signal generator for, based on the decode signal, selectively outputting to one of the plurality of light source blocks a light-source control signal which is in accordance with the level of the display signal.

In a preferred embodiment, the illuminator includes a power supply which is provided in common for the plurality of light source blocks.

In a preferred embodiment, the power supply outputs a constant level of current.

In a preferred embodiment, the power supply has a limiter.

In a preferred embodiment, the illuminator is an edge-light type illuminator.

In a preferred embodiment, the illuminator is a direct-type illuminator.

In a preferred embodiment, the display panel includes a pair of opposing substrates and a liquid crystal layer provided between the pair of substrates.

In a preferred embodiment, the display device according to the present invention is a display device to be mounted in an automotive vehicle.

An instrument panel according to another preferred embodiment of the present invention includes a display device of the above construction.

In a preferred embodiment, the illuminator is configured so that, in the displaying region of the display panel, light is substantially not emitted in any portion not being used as a displaying region of the instrument panel.

Alternatively, an instrument panel according to another preferred embodiment of the present invention is an instrument panel comprising a display device, wherein, the display device includes an illuminator and a display panel for performing displaying by using light which is emitted from the illuminator; and the illuminator is configured so that, in the displaying region of the display panel, light is substantially not emitted in any portion not being used as a displaying region of the instrument panel.

An automotive vehicle according to yet another preferred embodiment of the present invention includes an instrument panel of the above construction.

A driving method for a display device according to a further preferred embodiment of the present invention is a driving method for a display device having an illuminator and a display panel for performing displaying by using light which is emitted from the illuminator, wherein the illuminator includes a plurality of light source blocks, at least one light source belonging to each of the plurality of light source blocks, and a displaying region of the display panel has a plurality of regions each performing displaying by using light which is emitted from a respective one of the plurality of light source blocks, the driving method comprising: a step of detecting a level of a display signal which is input to each of the plurality of regions; and a step of controlling a luminance of the respective light source block in accordance with the detected level of the display signal.

In a preferred embodiment, the step of controlling the luminance of each light source block is performed, in accordance with the level of a display signal corresponding to a highest display luminance among display signals having been detected with respect to each of the plurality of regions, so as to assign a higher luminance for the light source block as a display luminance corresponding to the display signal becomes higher.

In a preferred embodiment, the step of controlling the luminance of each light source block is performed by varying an emission intensity of the light source belonging to each light source block.

In a preferred embodiment, the step of controlling the luminance of each light source block is performed by varying an activation time of the light source belonging to the respective light source block.

A liquid crystal display device according to a preferred embodiment of the present invention includes a control circuit for controlling an illuminator. The control circuit detects the level of a display signal (at least one display signal) which is input to each of a plurality of regions within the displaying region of a display panel, and is capable of controlling the luminance of each light source block in accordance with the detected level of the display signal. As a result, the power consumption of the illuminator can be reduced by suppressing unnecessary light emission, and the power consumption of the liquid crystal display device as a whole can also be reduced.

Other features, elements, steps, characteristics and advantages of the present invention will be described below with reference to preferred embodiments thereof and the attached drawings.

BRIEF DESCRIPTION OF DRAWINGS

FIG. 13(a) is a cross-sectional view, and FIG. 13(b) is an exploded perspective view.

DETAILED DESCRIPTION OF PREFERRED EMBODIMENTS

Hereinafter, preferred embodiments of the present invention will be described with reference to the drawings. Note that the present invention is not to be limited to the following preferred embodiments.

Figure 1:
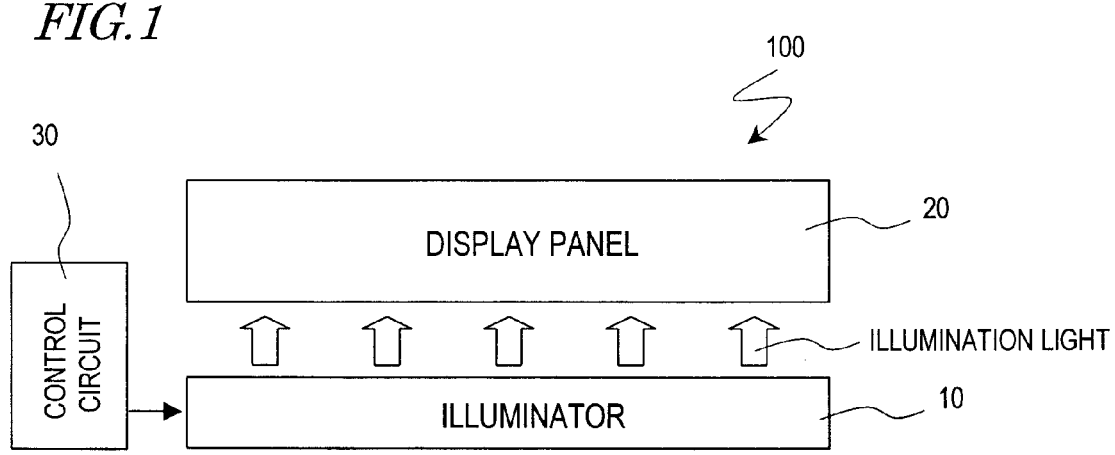
FIG. 1 is a diagram schematically showing a liquid crystal display device 100 according to a preferred embodiment of the present invention.
Figure 2:
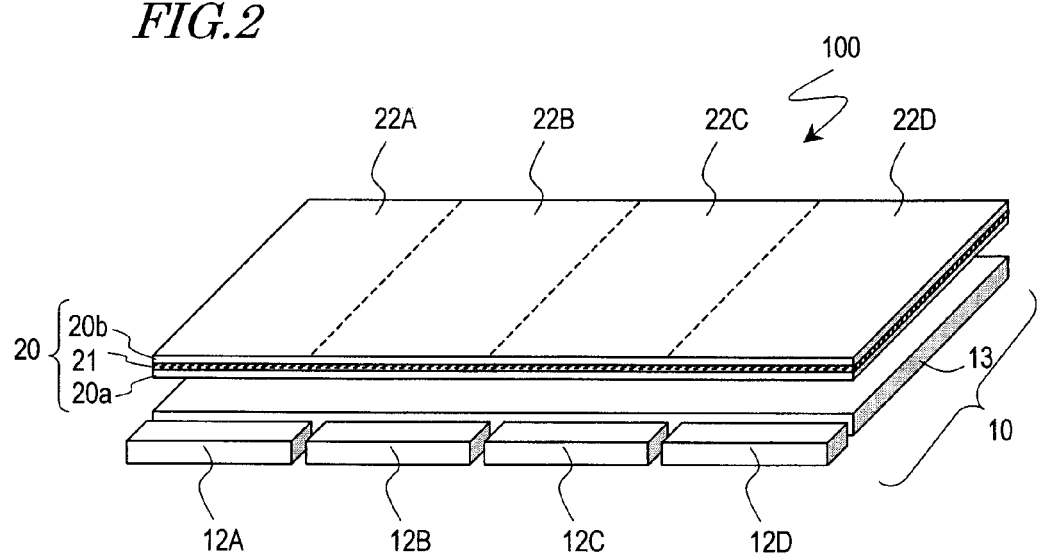
FIG. 2 is a perspective view schematically showing a liquid crystal display device 100 according to a preferred embodiment of the present invention.

FIG. 1 and FIG. 2 schematically show a liquid crystal display device 100 according to the present preferred embodiment. As shown in FIG. 1, the liquid crystal display device 100 includes: an illuminator (backlight) 10; a liquid crystal display panel 20 for performing displaying by using light which is emitted from the illuminator 10; and a control circuit 30 which is connected to the illuminator 10 for controlling the illuminator 10.

As shown in FIG. 2, the illuminator 10 is a backlight of an edge-light type, including: a plurality of light source blocks 12A to 12D; and a light guide plate (optical guide) 13 for guiding the light which is emitted from the light source blocks 12A to 12D to the liquid crystal display panel 20.

Each of the light source blocks 12A to 12D is a complex of light sources including at least one light source (or is a single light source in the case where there is only one light source). The light source(s) belonging to each of the light source blocks 12A to 12D is an LED(s), for example. For each of the light source blocks 12A to 12D, a light-source controller (not shown here) for controlling the light source(s) based on a signal which is output from the control circuit 30 is provided.

As the light guide plate 13, various known light guide plates can be used, for example. Structures for allowing the light propagating within the light guide plate 13 to be taken out toward the liquid crystal display panel 20 are provided on the light guide plate 13. For example, prisms, grains, or the like are provided on at least one of the two principal faces of the light guide plate 13.

The liquid crystal display panel 20 includes a pair of opposing substrates 20a and 20b, and a liquid crystal layer 21 provided between the substrates 20a and 20b. On the faces of the substrates 20a and 20b facing the liquid crystal layer 21, electrodes for applying a voltage across the liquid crystal layer 21, alignment films for defining the alignment direction(s) in the liquid crystal layer 21 (neither of which are shown), and the like are provided.

The displaying region of the liquid crystal display panel 20 is divided into a plurality of regions 22A to 22D, each which has a plurality of pixels. The regions 22A to 22D, which are in one-to-one correspondence with the light source blocks 12A to 12D, each perform displaying by using the light which is emitted from the corresponding light source block. In the present preferred embodiment, the regions 22A to 22D are arranged along a horizontal scanning direction (which typically coincides with the direction in which the scanning lines extend) of the liquid crystal display panel 10, and the plurality of light source blocks 12A to 12D are similarly arranged along the horizontal scanning direction.

The control circuit 30 detects the level of at least one display signal which is input to each of the plurality of regions 22A to 22D of the display panel 20, and is capable of controlling the luminance of each of the light source blocks 12A to 12D in accordance with the level of the detected display signal. Note that, in the present preferred embodiment, not only a display signal, but also a horizontal synchronizing signal, a vertical synchronizing signal, a dot clock signal, and the like are input to the control circuit 30 to enable the aforementioned control.

Moreover, in accordance with the level of a display signal corresponding to the highest display luminance among the display signals that have been detected with respect to each of the regions 22A to 22D, the control circuit 30 of the present preferred embodiment controls the luminance of each of the light source blocks 12A to 12D, based on a predetermined relationship which assigns a higher luminance for a light source block as its display luminance becomes higher.

Figure 3:
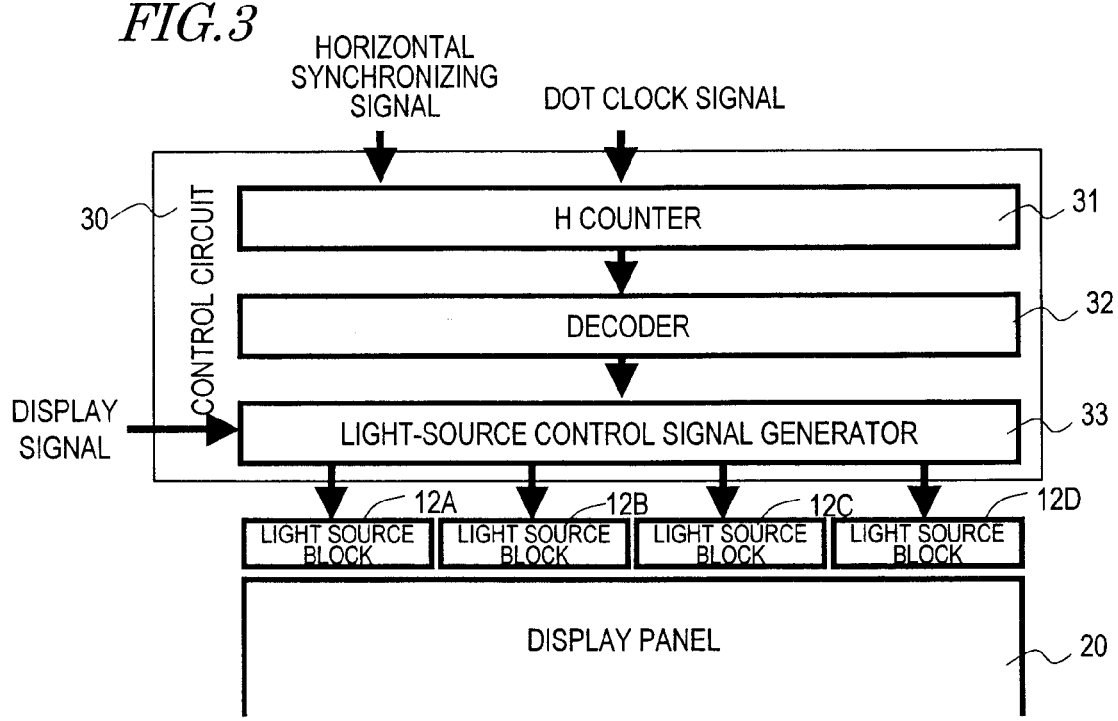
FIG. 3 is a block diagram schematically showing a control circuit 30 included in the liquid crystal display device 100.
Figure 4:
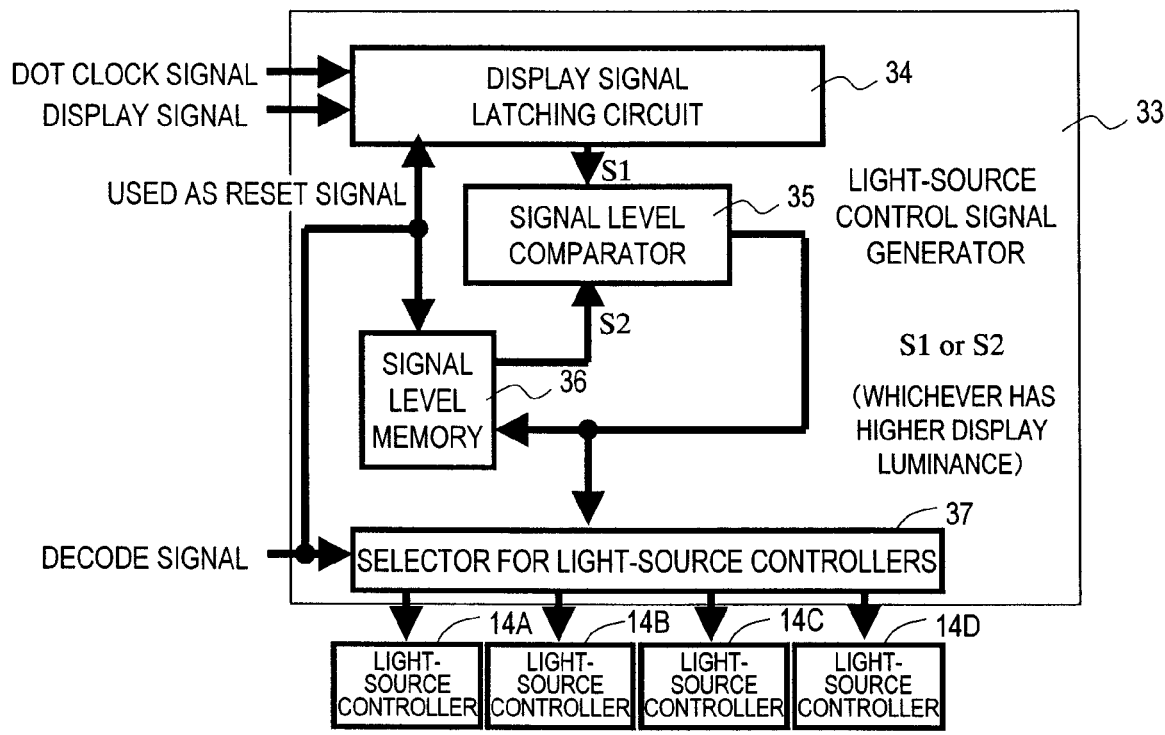
FIG. 4 is a block diagram schematically showing a light-source control signal generator 33 included in the control circuit 30.
Figure 5:
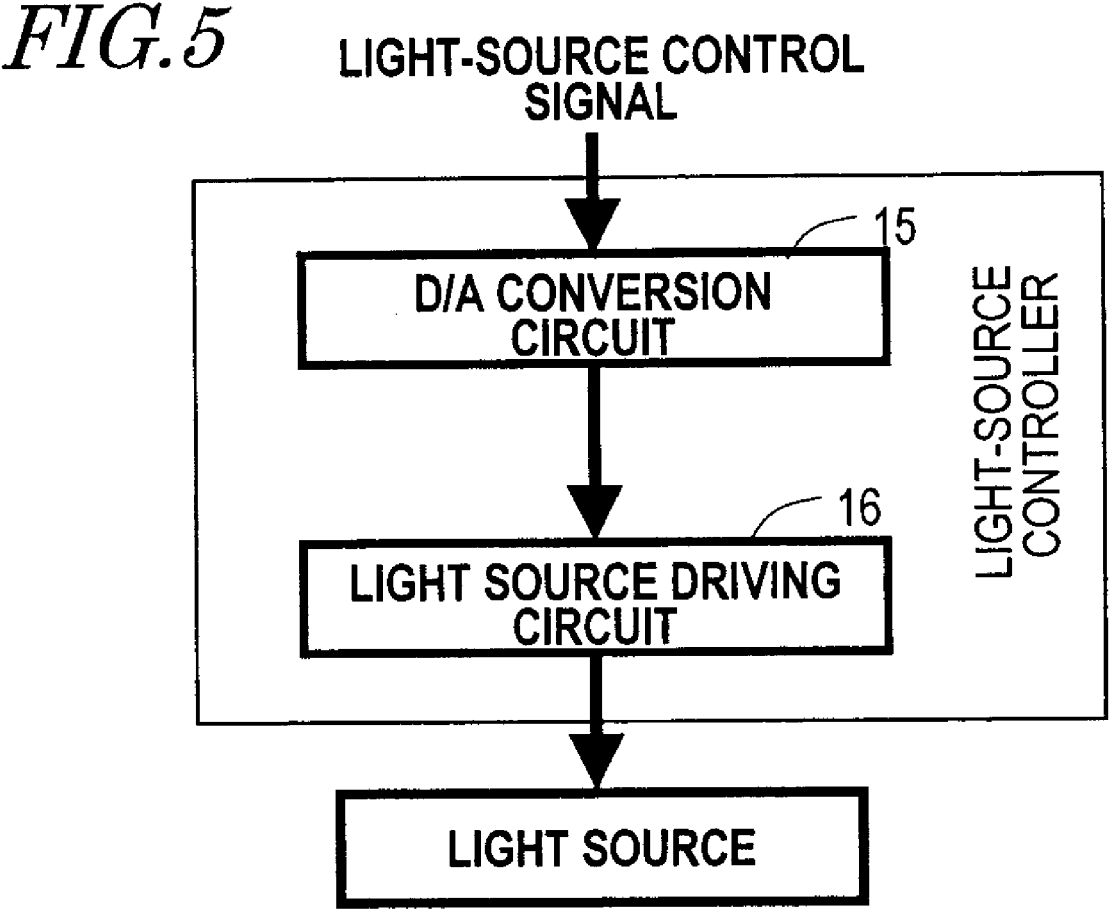
FIG. 5 is a block diagram schematically showing a light-source controller provided for each light source block.
Figure 6:
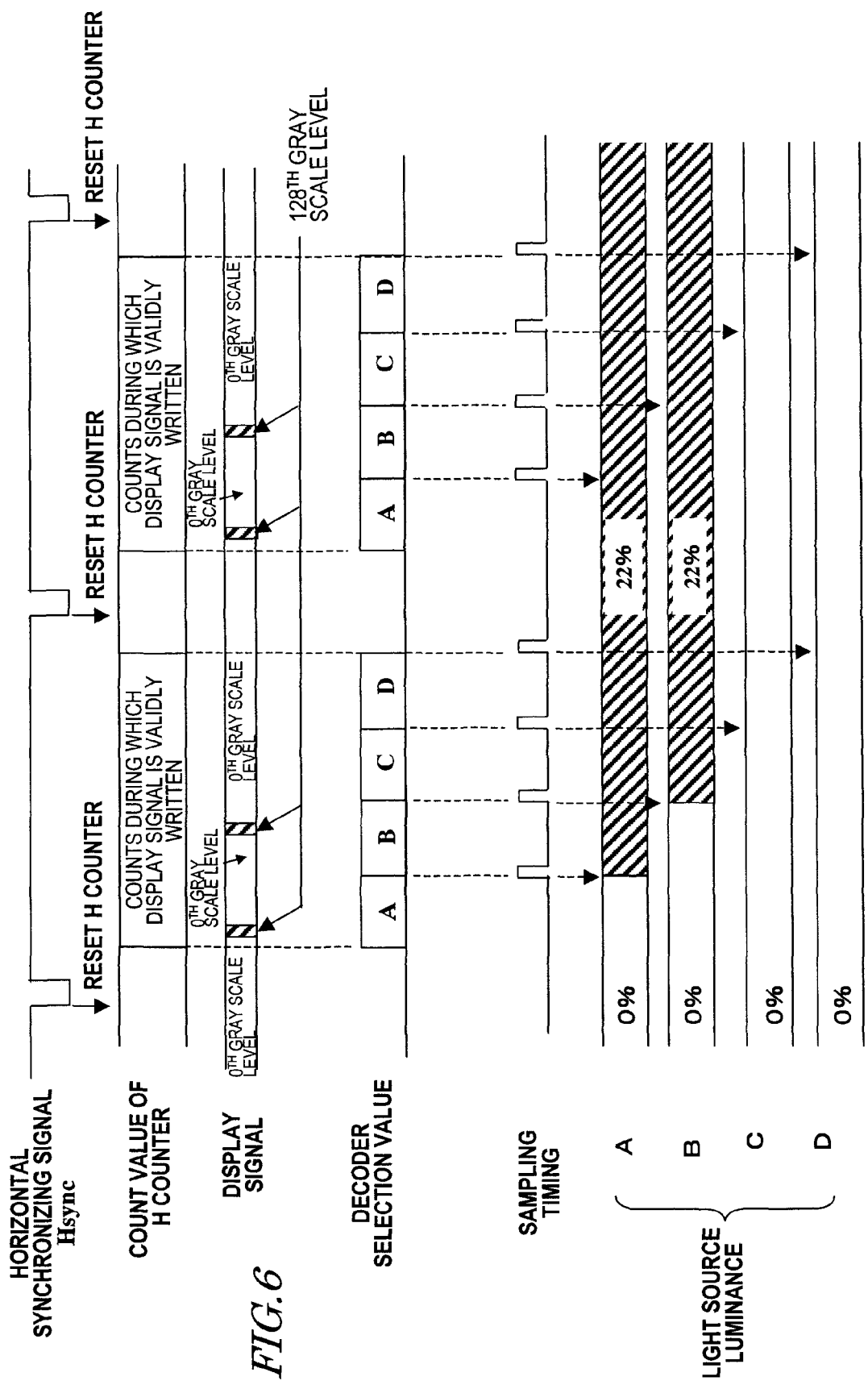
FIG. 6 is a timing chart with which to control light source blocks 12A to 12D.

Hereinafter, the specific construction of the control circuit 30 will be described with reference to FIG. 3 to FIG. 6. FIG. 3, FIG. 4, and FIG. 5 are diagrams showing an exemplary construction of the control circuit 30, and FIG. 6 is an exemplary timing chart with which to control the light source blocks 12A to 12D. As shown in FIG. 3, the control circuit 30 of the present preferred embodiment includes a horizontal counter (H counter) 31, a decoder 32, and a light-source control signal generator 33.

Using the horizontal synchronizing signal as a reset signal, the H counter 31 counts the dot clock signal. In accordance with the count value of the H counter 31, the decoder 32 outputs a decode signal (described later) to the light-source control signal generator 33. Display signals and the decode signal which is output from the decoder 32 are input to the light-source control signal generator 33, and the light-source control signal generator 33 generates light-source control signals for controlling the light sources based on the display signals. Note that, although not shown, the dot clock signal is also input to the decoder 32 and the light-source control signal generator 33.

The decoder 32 generates a decode signal which causes the light-source control signal generator 33 to select one of the light source blocks 12A to 12D. For example, assuming that the number of dot clocks in a period (within one scanning period) during which a display signal is validly written is 640, the decoder 32 outputs a decode signal such that: the light source block 12A is selected during the period from count values 1 to 160; the light source block 12B is selected during the period from count values 161 to 320; the light source block 12C is selected during the period from count values 321 to 480; and the light source block 12D is selected during the period from count values 481 to 640. Thus, the light-source control signal which is generated by the light-source control signal generator 33 is selectively output to one of the light source blocks 12A to 12D.

As shown in FIG. 4, the light-source control signal generator 33 includes a display signal latching circuit 34, a signal level comparator 35, a signal level memory 36, and a selector 37 for light-source controllers.

A display signal which is input to the light-source control signal generator 33 is latched by the display signal latching circuit 34 with the timing of a dot clock, and thereafter is output to the signal level comparator 35. The signal level comparator 35 compares the latched display signal S1 against a display signal S2 which is read from the signal level memory 36, and outputs the signal having the higher display luminance. Under a display mode in which a high-luminance displaying is to be performed when the level of the display signal is high, the signal level comparator 35 outputs one of the display signals S1 and S2 that has the higher level. Under a display mode in which a high-luminance displaying is to be performed when the level of the display signal is low, the signal level comparator 35 outputs one of the display signals S1 and S2 that has the lower level.

The signal which is output from the signal level comparator 35 is sent to the signal level memory 36 and the selector 37 for light-source controllers. Since a display signal having the higher display luminance is each time output from the signal level comparator 35, the signal level memory 36 will always have the display signal having the higher display luminance stored therein. Therefore, the display signal that corresponds to the highest display luminance among the detected display signals will be stored in the end. In accordance with a decode signal which is output from the decoder 32, the selector 37 for light-source controllers outputs a light-source control signal to the light-source controller 14A to 14D for one of the light source blocks 12A to 12D. In the present preferred embodiment, a light-source control signal is output from the light source control selector 37 such that a light source block will have a higher emission intensity as the display luminance corresponding to the input display signal becomes higher. Note that, in the present preferred embodiment, the decode signal which is output from the decoder 32 is also used as reset signals for the display signal latching circuit 34 and the signal level memory 36.

FIG. 5 shows an exemplary specific construction for the light-source controllers 14A to 14D respectively provided for the light source blocks 12A to 12D.

Each of the light-source controllers 14A to 14D includes a digital/analog (D/A) conversion circuit 15 and a light source driving circuit 16. A light-source control signal which is input to the light-source controller is converted by the D/A conversion circuit 15 from a digital format to an analog format (D/A conversion), with a predetermined sampling timing. Although not shown, the D/A conversion circuit 15 also has the function of latching the light-source control signal with a sampling timing. As the sampling timing, the timing of switching the decode signal may be used, for example. The light-source control signal which has been subjected to D/A conversion is converted by the light source driving circuit 16 into a driving current for a light source, and thereafter sent to the corresponding light source. Note that, as necessary, the light-source control signal which has been subjected to D/A conversion may be passed through a low-pass filter (LPF) before being sent to the light source driving circuit 16.

As described above, the control circuit 30 of the present preferred embodiment detects the level of a display signal that is input to each of the plurality of regions 22A to 22D, into which the displaying region is divided, and is capable of controlling the luminance of each light source block in accordance with the level of the detected display signal.

FIG. 6 illustrates an example where, in a γ=2.2 display device which is capable of displaying 256 gray scale levels, a gray scale displaying (displaying at the 128th gray scale level) is being performed in a portion of a region 22A and a portion of a region 22B, while a black displaying (displaying at the 0th gray scale level) is being performed in an entire region 22C and an entire region 22D. In FIG. 6, symbols A to D refer to the light source blocks 12A to 12D, respectively.

As shown in FIG. 6, the display signals which are input to the regions 22A and 22B include display signals of a level corresponding to the 128th gray scale level, and therefore the light source blocks 12A and 12B corresponding to the regions 22A and 22B are controlled to a luminance of 22%. On the other hand, the display signals which are input to the regions 22C and 22D only include display signals of a level corresponding to the 0th gray scale level, and therefore the light source blocks 12C and 12D corresponding to the regions 22C and 22D are controlled to a luminance of 0%.

In conventional liquid crystal display devices, the light sources in the illuminator are always controlled to a luminance of 100%, irrespective of the levels of the display signals which are input to the displaying region. On the other hand, in the liquid crystal display device 100 of the present preferred embodiment, as described above, the luminance of each light source block is controlled in accordance with the levels of the display signals which are input to each of the regions into which the displaying region is divided. Therefore, the luminance of some (or all) of the light source blocks can be lowered (or zeroed) in accordance with the content that is being displayed in each region, whereby the power consumption of the illuminator 10 as a whole can be reduced.

Figure 7:
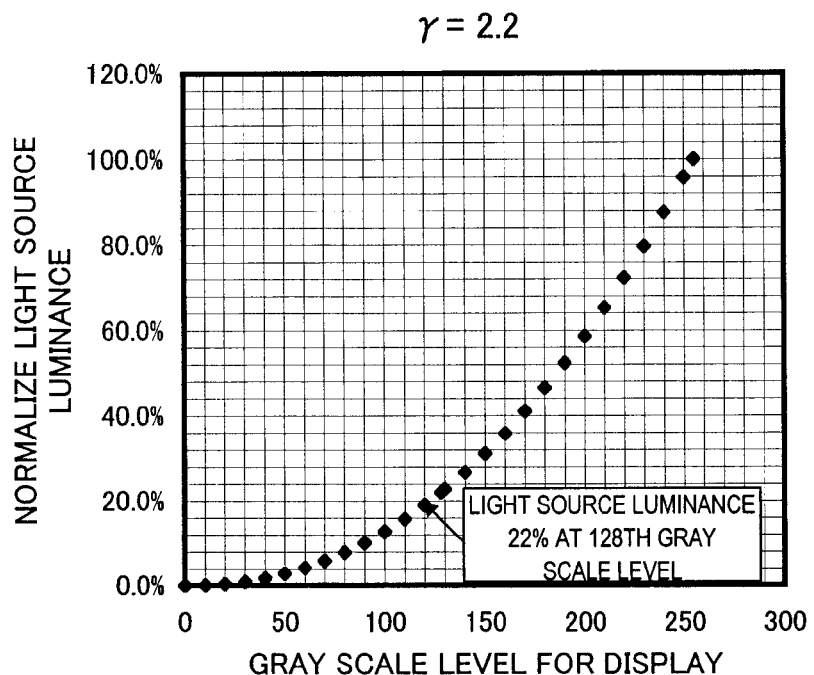
FIG. 7 is a graph showing an exemplary relationship between gray scale levels of a display signal and light source luminance.
Figure 8:
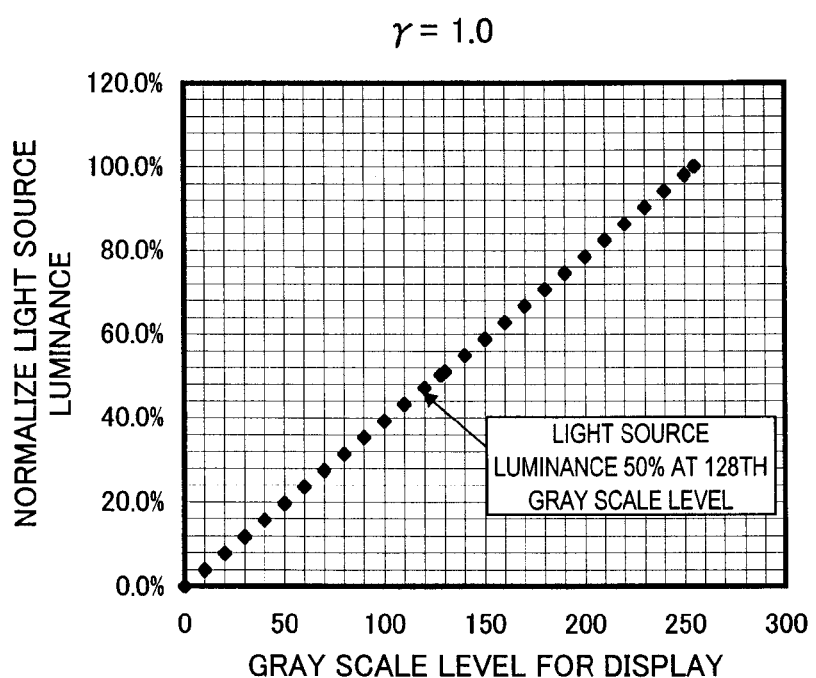
FIG. 8 is a graph showing an exemplary relationship between gray scale levels of a display signal and light source luminance.

Note that the relationship between the gray scale level of the display signal and the light source luminance may be a relationship which is adapted to γ=2.2 as shown in FIG. 7, or a directly proportional relationship adapted to γ=1.0 as shown in FIG. 8. Of course these are not exhaustive.

Moreover, a relationship which is adapted to gamma characteristics may be used as the relationship between the gray scale level of the display signal and light source luminance, for example. Furthermore, the base value (i.e., a luminance corresponding to 100%) of the light source luminance may be varied according to the environmental situation around the display device (such as the climatic situation, e.g., fine weather or rain, or the current time (whether it is in the daytime or at night)). For example, in fine weather or in the daytime, the base value of the light source luminance may be increased in order to increase the relative luminance against the exterior; and in rain or at night, the base value of the light source luminance may be lowered in order to decrease the relative luminance against the exterior. The climatic situation may be sensed by a sensor, for example, and time data can be easily obtained from the exterior of the display device as necessary.

Moreover, although the present preferred embodiment illustrates an example where the luminance of each light source block is controlled by varying the emission intensity of the light source(s), the luminance of each block may be controlled by varying the activation time of the light source(s). For example, the light source driving circuit 16 may be ON-OFF driven by a pulse width modulation method, whereby the activation time of the light source(s) can be varied.

Furthermore, although FIG. 6 illustrates an example where detection of display signal levels is performed with respect to every horizontal scanning period, the present invention is not limited thereto. Detection of display signal levels may be performed with respect to one particular horizontal scanning period among the horizontal scanning periods that are included in one vertical scanning period (i.e., with respect to a specific row of pixels), or with respect to a specific plurality of horizontal scanning periods (i.e., with respect to a specific plurality of rows of pixels). By adopting a construction such that the control circuit 30 causes the luminance of each light source block to be varied once in a plurality of vertical scanning periods, a less awkward displaying can be performed.

From the standpoint of reducing the production cost of the illuminator 10, it is preferable that a common power supply is provided in common for the plurality of light source blocks 12A to 12D. By ensuring that the power supply outputs a constant level of current, the luminance of the illuminator 10 as a whole can be made constant. Moreover, by providing in the power supply a limiter for limiting its output current to a predetermined value or lower, the power consumption of the illuminator 10 as a whole can be kept at a predetermined value or lower.

Figure 9:
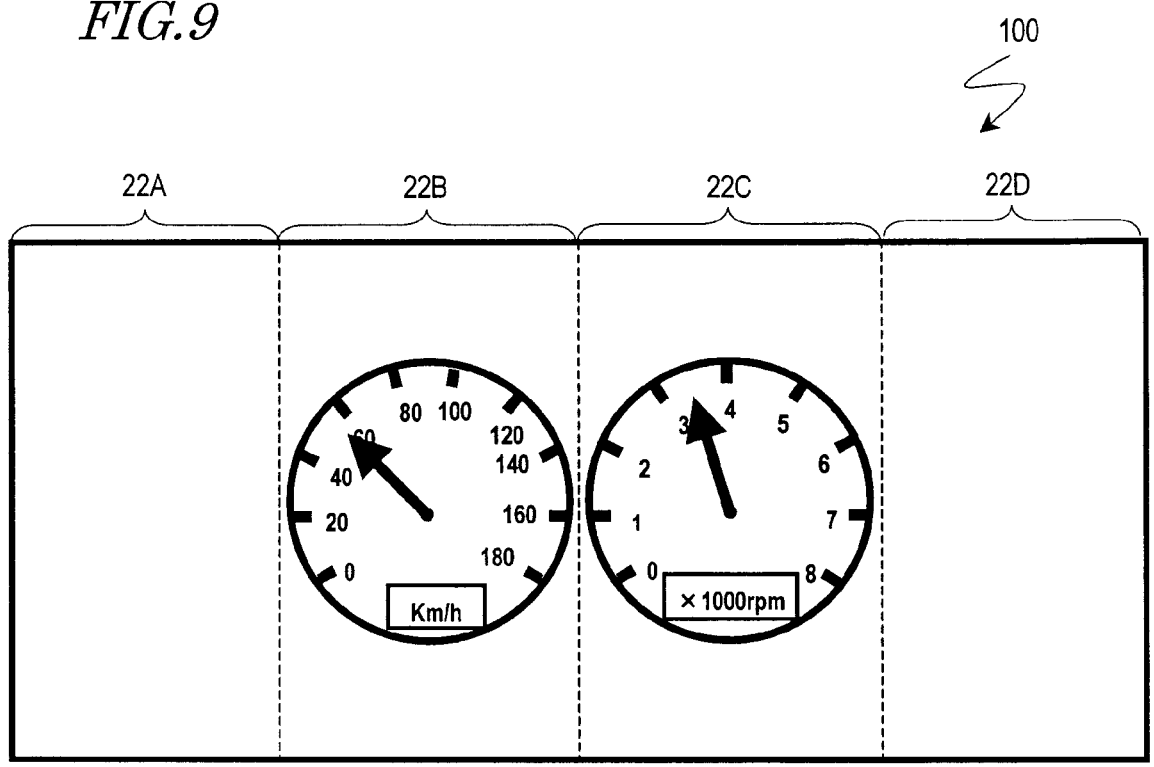
FIG. 9 is a diagram schematically showing a displayed image in the case where the liquid crystal display device 100 is used as a display device for an instrument panel.

As shown in FIG. 9, the liquid crystal display device 100 of the present preferred embodiment can be suitably used as a display device for an instrument panel to be mounted in an automotive vehicle. The liquid crystal display device 100 for an instrumental panel displays various information, including information which is necessary for driving the automotive vehicle. Although FIG. 9 illustrates an example where the velocity of the vehicle and the revolution of the engine are being displayed, it will be appreciated that the information to be displayed is not limited thereto. Alternatively, remaining fuel amount, water temperature, remaining battery power, shift lever position, and the like may also be displayed. Although FIG. 9 illustrates a displayed image resembling analog meters each having a dial and a needle, the displayed image may alternatively be in the form of a digital meter(s) on which changing numerical figures are shown with time, or the velocity or the like may be displayed in the manner of a graphic equalizer.

In the liquid crystal display device 100 for an instrument panel as shown in FIG. 9, the driver is more likely to watch the region 22B indicating the vehicle velocity and the region 22C indicating the engine revolution, while being less likely to watch the other regions 22A and 22D. Therefore, there will be no practical problems even if the luminance of the light source blocks 12A and 12D corresponding to the regions 22A and 22D is made relatively low. Thus, the present invention can be suitably used in the liquid crystal display device 100 for an instrument panel, because the content to be displayed in each one of a plurality of regions into which the displaying region is divided is to a certain extent predetermined.

Figure 10:
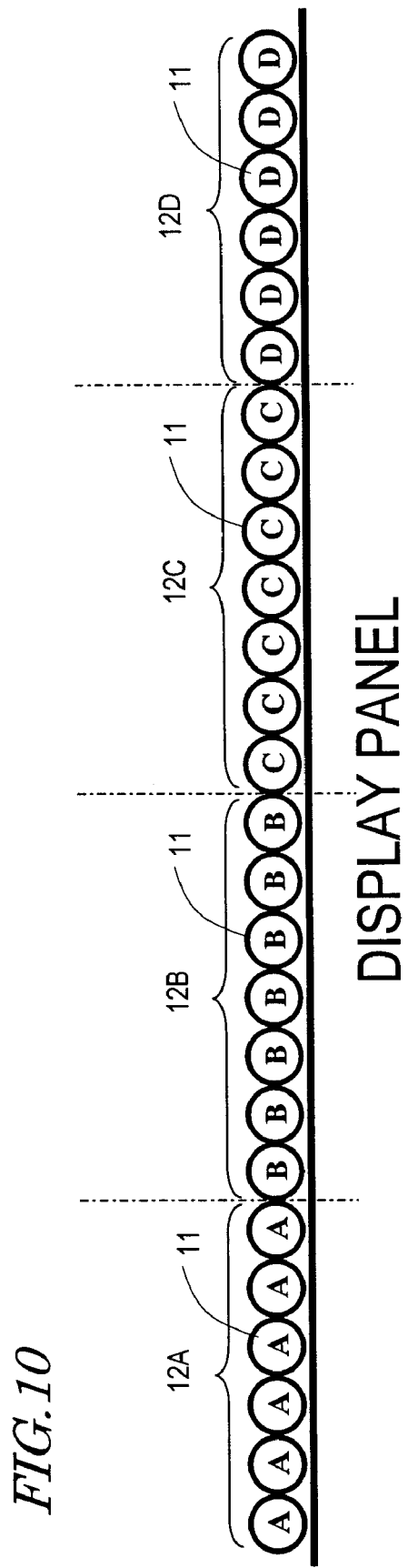
FIG. 10 is a diagram showing an exemplary arrangement of light sources included in the light source blocks 12A to 12D.
Figure 11:
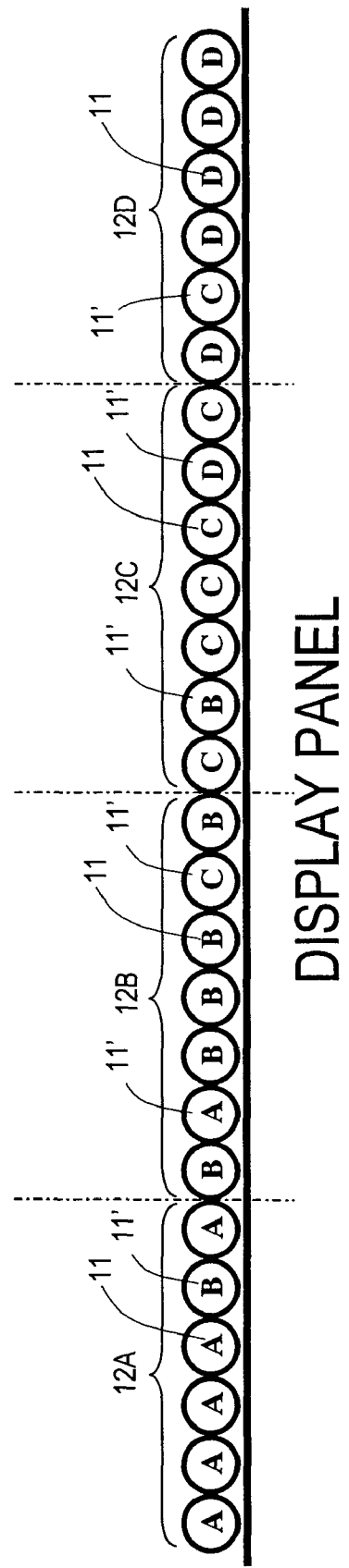
FIG. 11 is a diagram showing another exemplary arrangement of light sources included in the light source blocks 12A to 12D.

Next, specific arrangements of the light sources included in the light source blocks 12A to 12D will be described. FIG. 10 and FIG. 11 show exemplary arrangements of light sources. Note that, in FIG. 10 and FIG. 11, those light sources which are driven by the same light-source control signal are denoted by the same alphabetical letter.

In the arrangement shown in FIG. 10, all of the light sources 11 belonging to each of the light source blocks 12A to 12D are driven by the same light-source control signal. On the other hand, in the arrangement shown in FIG. 11, among the plurality of light sources belonging to each of the light source blocks 12A to 12D, some light sources 11' are driven by a light-source control signal which is different from that for the other light sources 11. Specifically, each light source block includes, near the boundary with an adjoining light source block, light sources 11' which are controlled similarly to the light sources 11 belonging to the adjoining light source block (i.e., driven by the same light-source control signal). The light sources 11' are connected to the light source driving circuit for the adjoining light source block. By arranging the light sources in the manner shown in FIG. 11, differences in luminance at the boundaries between light source blocks can be obscured, thus suppressing visual awkwardness.

The above descriptions illustrate the case where the light source blocks 12A to 12D are arranged along the horizontal scanning direction of the display panel 20 and the displaying region is divided into a plurality of regions arranged along the horizontal scanning direction. Alternatively, the light source blocks 12A to 12D may be arranged along the vertical scanning direction of the display panel 20, and the displaying region may be divided into a plurality of regions arranged along the vertical scanning direction.

In the case where a plurality of regions are arranged along the horizontal scanning direction, the control circuit 30 may sequentially detect the levels of display signals which are input to the plurality of regions, during a plurality of periods into which a specific horizontal scanning period is divided, this being done in the aforementioned manner, for example. On the other hand, in the case where a plurality of regions are arranged along the vertical scanning direction, the control circuit 30 may sequentially detect the levels of display signals which are input to the plurality of regions, during a plurality of periods into which a specific vertical scanning period is divided, for example. The construction of the control circuit for performing such detection is shown in FIG. 12.

Figure 12:
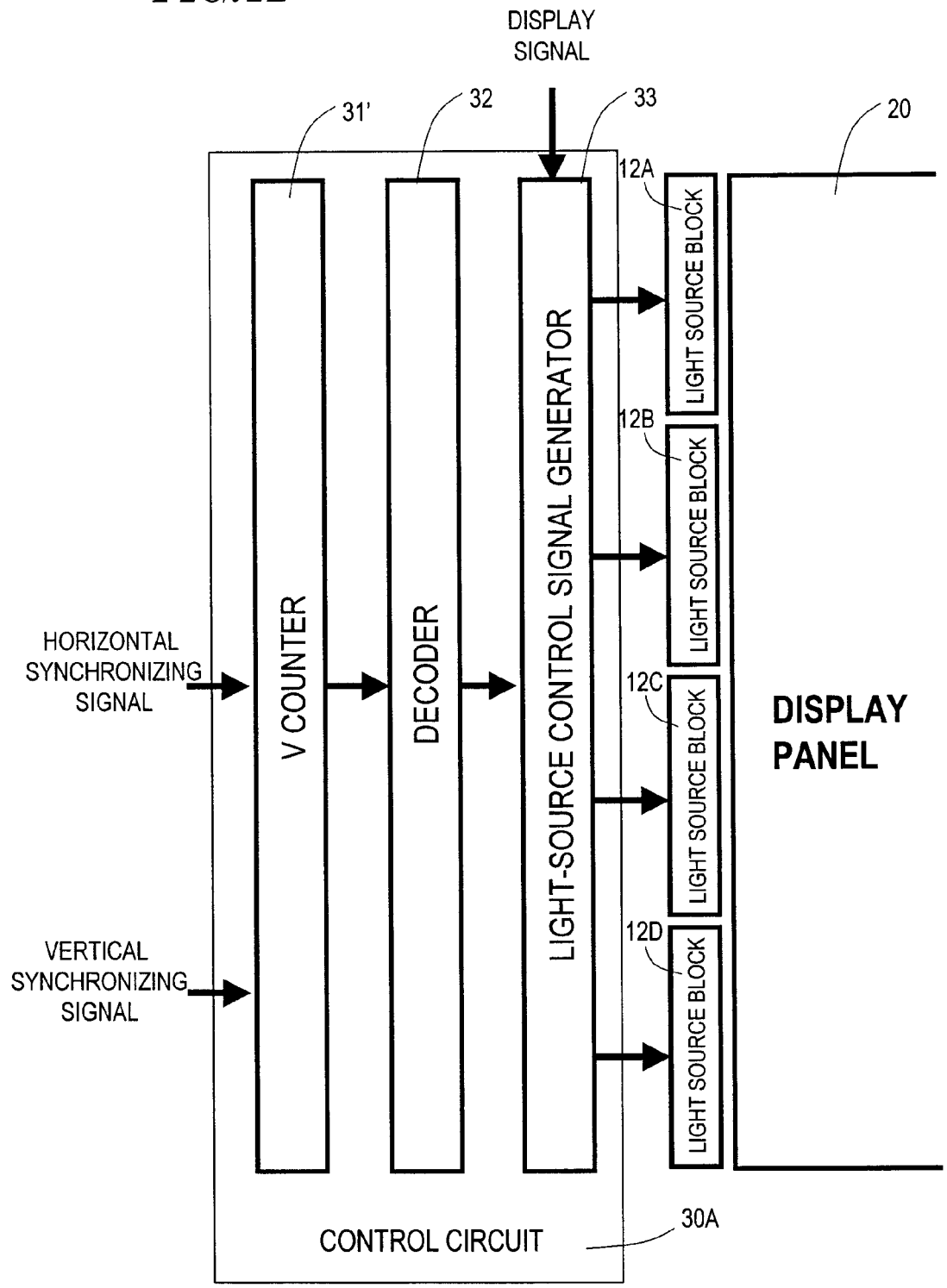
FIG. 12 is a block diagram schematically showing another control circuit 30A.

The control circuit 30A shown in FIG. 12 differs from the control circuit 30 shown in FIG. 3 in that a vertical counter (V counter) 31' is included, instead of the H counter 31. The V counter 31' counts the signal (e.g., horizontal synchronizing signal) that is input for every horizontal scanning period. As a reset signal for the V counter 31', the vertical synchronizing signal may be used, for example. The decoder 32 outputs to the light-source control signal generator 33 a decode signal which is in accordance with the count value of the V counter 31'. In accordance with the decode signal, the light-source control signal generator 33 outputs a light-source control signal to one of the light source blocks 12A to 12D. With such a construction, the plurality of light source blocks 12A to 12D arranged along the vertical scanning direction can be controlled.

Although the present preferred embodiment illustrates the present invention by taking as an example the liquid crystal display device 100 having the edge-light type illuminator 10, the present invention can also be suitably used for a liquid crystal display device having a direct-type illuminator.

Figure 13:
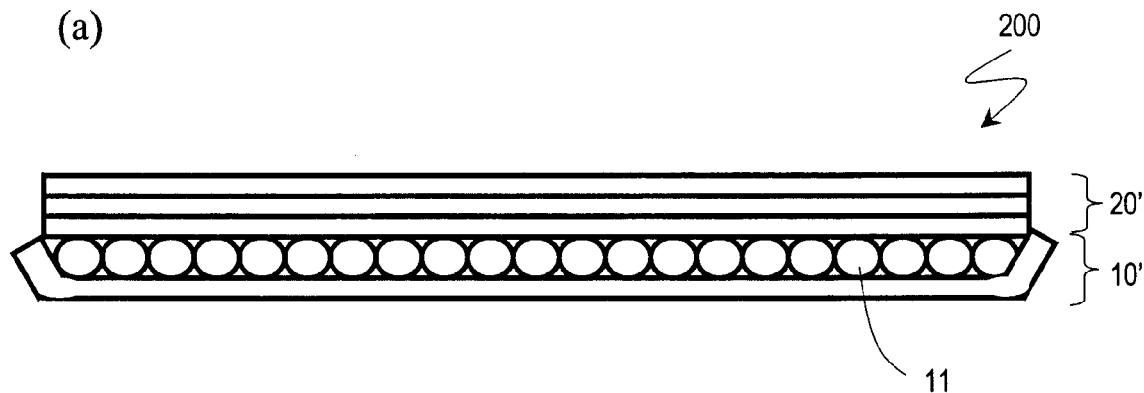
FIGS. 13(a) and 13(b) are diagrams schematically showing another liquid crystal display device 200 according to a preferred embodiment of the present invention, where
Figure 13:
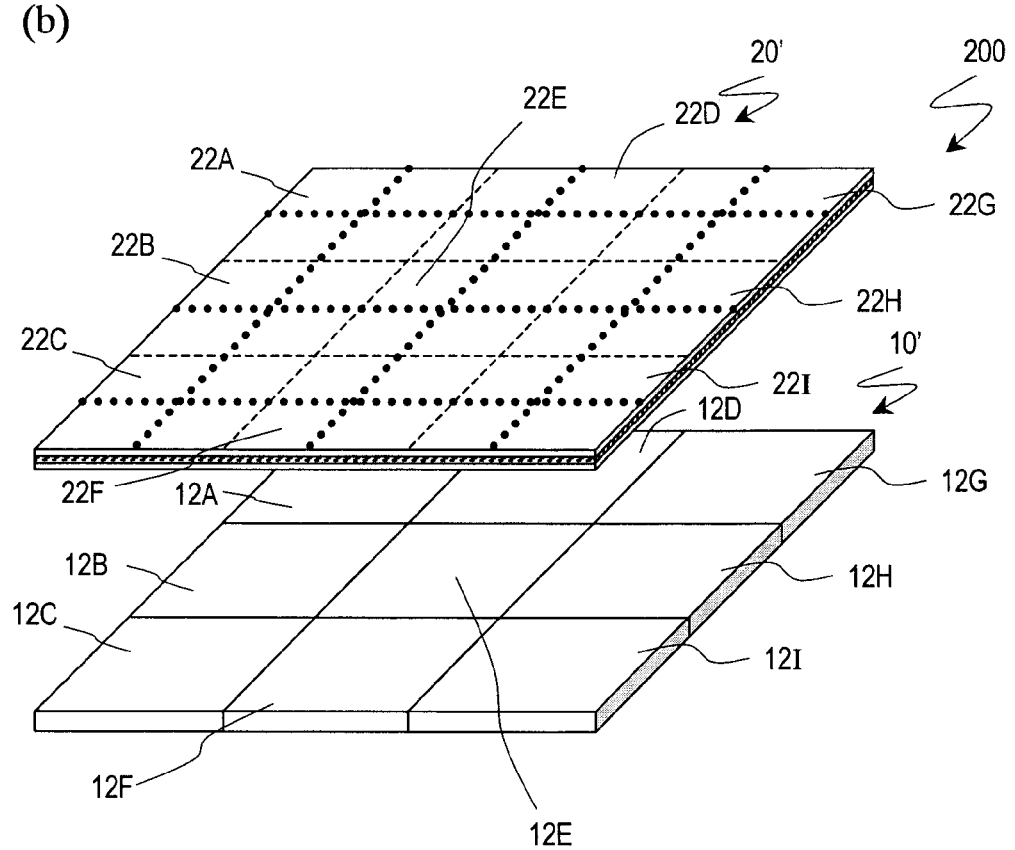

FIGS. 13(a) and 13(b) show a liquid crystal display device 200 having a direct-type illuminator 10'. FIG. 13(a) is a cross-sectional view schematically showing the liquid crystal display device 200, and FIG. 13(b) is an exploded perspective view schematically showing the liquid crystal display device 200.

As shown in FIG. 13(a), the illuminator 10' of the liquid crystal display device 200 is a direct-type illuminator having a plurality of light sources 11 which are provided directly under a liquid crystal display panel 20'. The light sources 11 are LEDs, for example.

As shown in FIG. 13(b), the plurality of light sources 11 of the illuminator 10' are grouped into a plurality of light source blocks 12A to 12I, the light source blocks 12A to 12I being arranged along both the horizontal scanning direction and the vertical scanning direction (i.e., in a matrix shape) of the liquid crystal display panel 20.

Moreover, the displaying region of the liquid crystal display panel 20' is divided into a plurality of regions 22A to 22I. The regions 22A to 22I are arranged along both the horizontal scanning direction and the vertical scanning direction (i.e., in a matrix shape). The regions 22A to 22I, which are in one-to-one correspondence with the light source blocks 12A to 12I, each perform displaying by using the light which is emitted from the corresponding light source block.

Figure 14:
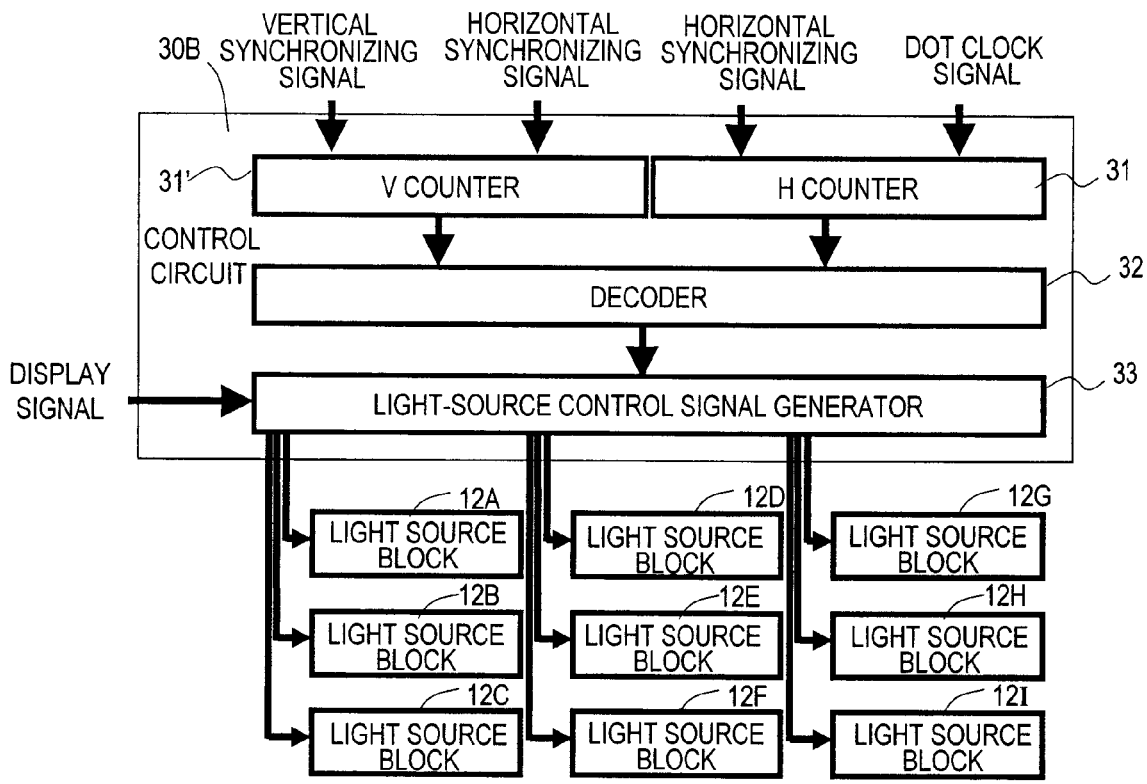
FIG. 14 is a block diagram schematically showing a control circuit 30B included in the liquid crystal display device 200.

FIG. 14 shows an exemplary construction of a control circuit for driving the illuminator 10' having the light source blocks 12A to 12I arranged in a matrix shape.

The control circuit 30B shown in FIG. 14 differs from the control circuit 30 shown in FIG. 3 in that a V counter 31' is included in addition to the H counter 31. The H counter 31 counts the dot clock signal by using the horizontal synchronizing signal as a reset signal, for example. The V counter 31' counts the horizontal synchronizing signal by using the vertical synchronizing signal as a reset signal, for example.

The decoder 32 outputs a decode signal which is in accordance with the count value of the H counter 31 and the count value of the V counter 31' to the light-source control signal generator 33. The light-source control signal generator 33 outputs a light-source control signal to one of the light source blocks 12A to 12I in accordance with the decode signal. With such a construction, the plurality of light source blocks 12A to 12I arranged in a matrix shape along the horizontal scanning direction and the vertical scanning direction can be controlled.

Note that detection of display signal levels may be performed with respect to specific rows of pixels and columns of pixels as shown by dotted lines in FIG. 13(b), or may be performed with respect to every pixel. Controlling of the light source blocks 12A to 12I can be achieved by detecting the level of a display signal that is input to at least one pixel in each of the regions 22A to 22I into which the displaying region is divided.

Moreover, the number of plural regions into which the displaying region is divided, the area of each individual region, etc., are not limited to those exemplified in the present preferred embodiment. The displaying region may be divided into any arbitrary number of regions, and the area of each individual region does not need to be the same.

Although the present preferred embodiment illustrates the case where, in each of the regions into which the displaying region is divided, the luminance of the light source block is controlled in accordance with the level of a display signal that corresponds to the highest display luminance among the detected display signals, the present invention is not limited thereto. For example, the luminance of each light source block may be controlled in accordance with an average value of the levels of a plurality of display signals which are input to each region.

Figure 15:
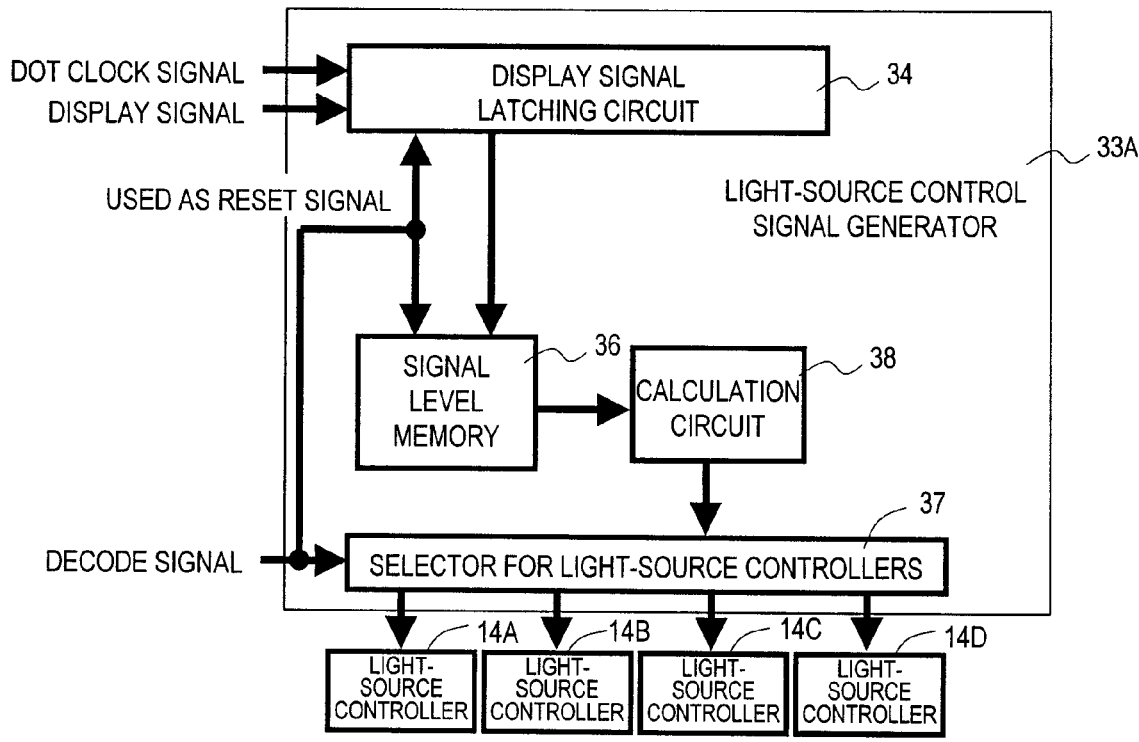
FIG. 15 is a block diagram schematically showing another light-source control signal generator 33A.

FIG. 15 shows an exemplary specific construction for performing control based on an average value of display signal levels. A light-source control signal generator 33A shown in FIG. 15 differs from the light-source control signal generator 33 shown in FIG. 4 in that a calculation circuit 38 is included, instead of the signal level comparator 35. In the light-source control signal generator 33A, display signals which are latched by the display signal latching circuit 34 are first sequentially sent to the signal level memory 36. Then, an average value of the levels of these display signals is derived by the calculation circuit 38, and thereafter sent to the selector 37 for light-source controllers. With such a construction, control based on an average value of display signal levels can be performed.

The present invention can be suitably used for various types of display devices, but is particularly suitably used in display devices for displaying artificially-created contents (i.e., non-naturally-occurring images), such as instrument panels as already described or display devices for amusement purposes. If it is known in advance what sort of contents are to be displayed, then the number of divisions in the displaying region, the area and arrangement of each divided region, etc., can be optimized, so that power consumption can be effectively reduced. Display devices for amusement purposes are display devices which are manufactured for playing purposes, e.g., display devices which are provided in video game machines, pachinko machines, pachi-slot machines, and the like.

Figure 16:
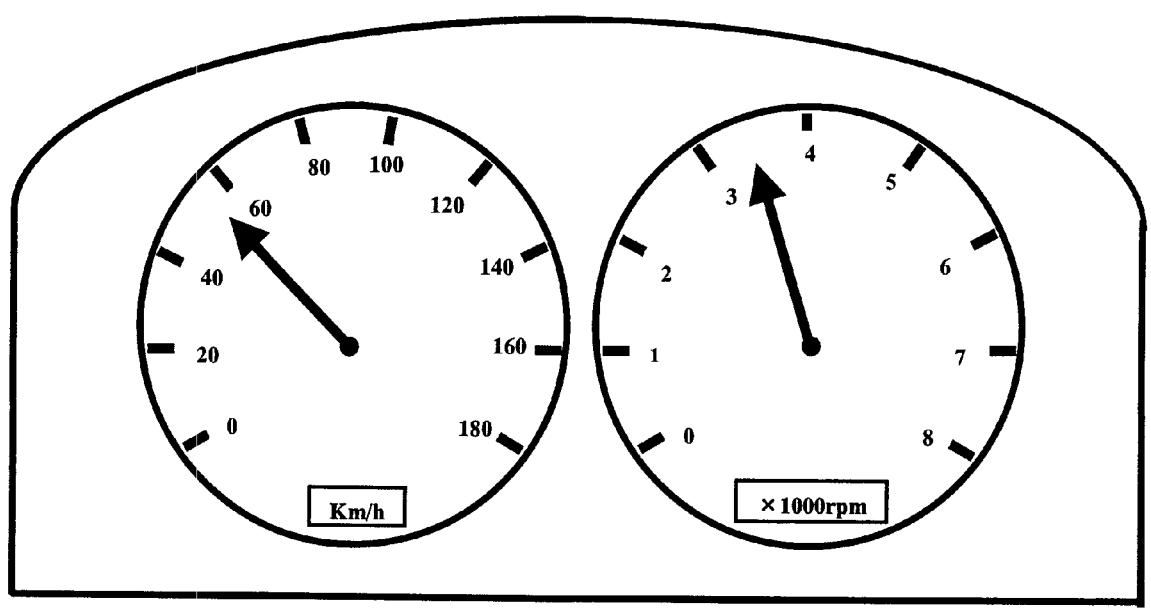
FIG. 16 is a diagram showing an example of an actual displaying region of an instrument panel.

Note that, when a display device is mounted in an instrument panel, the displaying region of the display panel may possibly include portions which are not utilized as the displaying region of the instrument panel. For example, it is often the case that the actual displaying region of the instrument panel is not exactly rectangular, as shown in FIG. 16. In the case where the displaying region of the instrument panel is shaped similarly to a cross section of a semi-cylinder as shown in FIG. 16, the portions corresponding to the upper two corners in the displaying region of a rectangular display panel would not contribute to displaying.

Thus, in the case where the displaying region of the display panel includes portions which are not utilized as the displaying region of the instrument panel, power consumption can be further reduced if the control circuit is configured so that light is substantially not emitted in any such portions, irrespective of the level of the display signal. For example, in the case of an edge-light type illuminator, the shape of the light guide plate may be made generally identical to the shape of the displaying region of the instrument panel, thus ensuring that light is not emitted in any such portions. In the case of a direct-type illuminator, light sources to be arranged directly under any such portion may be omitted, thus ensuring that light is not emitted in those portions.

Moreover, a reflection-type polarizer as described in Patent Document 1 may be provided on the illuminator side of the display panel. By using a reflection-type polarizer, the efficiency of utilization of the outgoing light from the light source blocks is improved, whereby power consumption can be further reduced.

According to various preferred embodiments of the present invention, a display device having a superbly low power consumption and a driving method therefore are provided. The display device according to preferred embodiments of the present invention is suitably used for instruments panel and automotive vehicles. Also, the display device according to preferred embodiments of the present invention is suitably used for amusement purposes.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. A display device comprising:
an illuminator;
a display panel for performing displaying by using light which is emitted from the illuminator; and
a control circuit for controlling the illuminator; wherein
the illuminator includes a plurality of light source blocks, at least one light source belonging to each of the plurality of light source blocks;
a displaying region of the display panel has a plurality of regions each performing displaying by using light which is emitted from a respective one of the plurality of light source blocks;
the control circuit detects a level of a display signal which is input to each of the plurality of regions, and is capable of controlling a luminance of the respective light source block in accordance with the detected level of the display signal; and
each of the plurality of light source blocks includes, near a boundary with an adjoining light source block, a further light source which is controlled in a similar manner to the light source belonging to the adjoining light source block.

2. The display device of claim 1, wherein, in accordance with the level of a display signal corresponding to a highest display luminance among display signals having been detected with respect to each of the plurality of regions, the control circuit controls the luminance of each light source block based on a predetermined relationship which assigns a higher luminance for the light source block as a display luminance corresponding to the display signal becomes higher.

3. The display device of claim 1, wherein the control circuit controls the luminance of each light source block by varying an emission intensity of the light source belonging to each light source block.

4. The display device of claim 1, wherein the control circuit is capable of controlling the luminance of each light source block by varying an activation time of the light source belonging to the respective light source block.

5. The display device of claim 1, wherein the plurality of regions include at least two regions arranged along a horizontal scanning direction of the display panel.

6. The display device of claim 5, wherein, during a plurality of periods into which a specific horizontal scanning period is divided, the control circuit sequentially detects levels of display signals which are input to the at least two regions arranged along the horizontal scanning direction.

7. The display device of claim 1, wherein the plurality of regions include at least two regions arranged along a vertical scanning direction of the display panel.

8. The display device of claim 7, wherein, during a plurality of periods into which a specific vertical scanning period is divided, the control circuit sequentially detects levels of display signals which are input to the at least two regions arranged along the vertical scanning direction.

9. The display device of claim 1, wherein the control circuit varies the luminance of each light source block once in a plurality of vertical scanning periods.

10. The display device of claim 9, wherein the illuminator includes a power supply which is provided in common for the plurality of light source blocks.

11. The display device of claim 10, wherein the power supply outputs a constant level of current.

12. The display device of claim 10, wherein the power supply has a limiter.

13. The display device of claim 1, wherein the illuminator is an edge-light type illuminator.

14. The display device of claim 1, wherein the illuminator is a direct-type illuminator.

15. The display device of claim 1, wherein the display panel includes a pair of opposing substrates and a liquid crystal layer provided between the pair of substrates.

16. The display device of claim 1, wherein the display device is a display device to be mounted in an automotive vehicle.

17. An instrument panel comprising the display device of claim 1.

18. The instrument panel of claim 17, wherein the illuminator is configured so that, in the displaying region of the display panel, light is substantially not emitted in any portion not being used as a displaying region of the instrument panel.

19. An automotive vehicle comprising the instrument panel of claim 17.

20. A driving method for a display device having an illuminator and a display panel for performing displaying by using light which is emitted from the illuminator, wherein the illuminator includes a plurality of light source blocks, at least one light source belonging to each of the plurality of light source blocks, and a displaying region of the display panel has a plurality of regions each performing displaying by using light which is emitted from a respective one of the plurality of light source blocks, the driving method comprising:
    a step of detecting a level of a display signal which is input to each of the plurality of regions; and
    a step of controlling a luminance of the respective light source block in accordance with the detected level of the display signal; wherein
    each of the plurality of light source blocks includes, near a boundary with an adjoining light source block, a further light source which is controlled in a similar manner to the light source belonging to the adjoining light source block.

21. The driving method for a display device of claim 20, wherein the step of controlling the luminance of each light source block is performed, in accordance with the level of a display signal corresponding to a highest display luminance among display signals having been detected with respect to each of the plurality of regions, so as to assign a higher luminance for the light source block as a display luminance corresponding to the display signal becomes higher.

22. The driving method for a display device of claim 20, wherein the step of controlling the luminance of each light source block is performed by varying an emission intensity of the light source belonging to each light source block.

23. The driving method for a display device of claim 20, wherein the step of controlling the luminance of each light source block is performed by varying an activation time of the light source belonging to the respective light source block.

* * * * *